US011649368B2

(12) United States Patent
Ewert et al.

(10) Patent No.: US 11,649,368 B2
(45) Date of Patent: May 16, 2023

(54) RHEOLOGICAL METHODS FOR HIGH BLOCK, TACK AND SCRUB RESISTANT COATING COMPOSITION

(71) Applicant: SWIMC LLC, Cleveland, OH (US)

(72) Inventors: Tessie Rose Ewert, Minneapolis, MN (US); Tyler Bell, Lake In The Hills, IL (US); Robert Sandoval, Crystal Lake, IL (US); Mary Jane Hibben, Elburn, IL (US)

( * ) Notice: Subject to any disclaimer, the term of this patent is extended or adjusted under 35 U.S.C. 154(b) by 70 days.

(21) Appl. No.: 17/462,226

(22) Filed: Aug. 31, 2021

(65) Prior Publication Data

US 2022/0056300 A1 Feb. 24, 2022

Related U.S. Application Data

(63) Continuation of application No. 16/834,416, filed on Mar. 30, 2020, now Pat. No. 11,136,468, which is a continuation of application No. 15/664,676, filed on Jul. 31, 2017, now Pat. No. 10,626,284, which is a continuation-in-part of application No. 15/012,240, filed on Feb. 1, 2016, now Pat. No. 10,273,378, which is a continuation-in-part of application No. 14/285,722, filed on May 23, 2014, now Pat. No. 9,611,393, which is a continuation of application No. PCT/US2012/069108, filed on Dec. 12, 2012.

(60) Provisional application No. 61/576,021, filed on Dec. 15, 2011.

(51) Int. Cl.
| | |
|---|---|
| *C09D 133/26* | (2006.01) |
| *C09D 5/00* | (2006.01) |
| *C09D 113/02* | (2006.01) |
| *C09D 7/40* | (2018.01) |
| *C09D 7/80* | (2018.01) |
| *C09D 5/08* | (2006.01) |
| *C09D 133/14* | (2006.01) |
| *C09D 133/10* | (2006.01) |
| *C08K 5/02* | (2006.01) |
| *C08F 2/00* | (2006.01) |

(52) U.S. Cl.
CPC ............ *C09D 113/02* (2013.01); *C08F 2/001* (2013.01); *C08K 5/02* (2013.01); *C09D 5/00* (2013.01); *C09D 5/08* (2013.01); *C09D 7/40* (2018.01); *C09D 7/80* (2018.01); *C09D 133/10* (2013.01); *C09D 133/14* (2013.01); *C09D 133/26* (2013.01); *C08L 2201/54* (2013.01); *C08L 2312/00* (2013.01)

(58) Field of Classification Search
CPC .......... C09D 113/02; C09D 7/40; C09D 7/80; C09D 5/00; C09D 5/08; C09D 133/10; C09D 133/14; C09D 133/26; C08F 2/001; C08K 5/02; C08L 2201/54; C08L 2312/00

USPC ........................................................ 524/813
See application file for complete search history.

(56) References Cited

U.S. PATENT DOCUMENTS

| | | | |
|---|---|---|---|
| 5,021,469 A | 6/1991 | Langerbeins et al. | |
| 5,208,285 A | * 5/1993 | Boyce .................. | C09D 131/04 524/516 |
| 6,060,532 A | * 5/2000 | Frankel ................. | C08F 265/06 522/109 |
| 6,488,760 B1 | 12/2002 | Binns et al. | |
| 6,723,779 B2 | 4/2004 | Drujon et al. | |
| 6,762,230 B2 | 7/2004 | Brandenburger et al. | |
| 6,992,121 B1 | 1/2006 | Peters et al. | |
| 7,049,352 B2 | 5/2006 | Gould et al. | |
| 7,285,590 B2 | 10/2007 | Holub et al. | |
| 7,612,126 B2 | 11/2009 | Roschmann et al. | |
| 7,659,340 B2 | 2/2010 | Coward et al. | |
| 7,812,079 B2 | 10/2010 | Brandenburger et al. | |
| 7,812,090 B2 | 10/2010 | Killilea et al. | |
| 7,906,577 B2 | 3/2011 | Zong et al. | |
| 8,013,050 B2 | 9/2011 | Mestach et al. | |
| 8,822,580 B2 | 9/2014 | Korenkiewicz et al. | |
| 8,980,995 B2 | 3/2015 | Yang et al. | |
| 9,611,393 B2 | 4/2017 | Hibben et al. | |
| 10,273,378 B2 | 4/2019 | Bell et al. | |
| 10,301,501 B2 | 5/2019 | Hibben et al. | |
| 10,626,284 B2 | 4/2020 | Ewert et al. | |
| 10,647,871 B2 | 5/2020 | Bell et al. | |

(Continued)

FOREIGN PATENT DOCUMENTS

| | | |
|---|---|---|
| CN | 1280594 | 1/2001 |
| CN | 101175827 | 5/2008 |

(Continued)

OTHER PUBLICATIONS

European Search Report for EP Patent Application No. 12 85 8509.8, dated May 27, 2015; 5 pages.

(Continued)

*Primary Examiner* — Kelechi C Egwim
(74) *Attorney, Agent, or Firm* — Meeting Raasch Group

(57) ABSTRACT

The present invention is directed to a coating composition or paint comprising a multistage latex with at least first and second stages, wherein the composition or paint is substantially free of volatile organic compounds (VOC) and capable of film formation even in the absence of coalescent agents. The base paint formulation is capable of being tinted at a point-of-sale (i.e. in-store) using a colorant composition of a type and quantity required to produce a paint of desired color and finish. The paints, show improved block resistance, scrub resistance and tack resistance. Rheological techniques as described herein may be used to determine tack resistance, print resistance, and other performance characteristics.

23 Claims, 1 Drawing Sheet

(56) References Cited

U.S. PATENT DOCUMENTS

| | | |
|---|---|---|
| 2007/0282046 A1 | 12/2007 | Killilea et al. |
| 2008/0058473 A1 | 3/2008 | Freidzon et al. |
| 2009/0143528 A1 | 6/2009 | Mestach et al. |
| 2010/0003442 A1 | 1/2010 | Even et al. |
| 2011/0151265 A1 | 6/2011 | Killilea et al. |
| 2016/0145460 A1 | 5/2016 | Bell et al. |
| 2017/0226369 A1 | 8/2017 | Hibben et al. |
| 2017/0247565 A1 | 8/2017 | Bell et al. |
| 2017/0335127 A1 | 11/2017 | Ewert et al. |
| 2020/0115585 A1 | 4/2020 | Bell et al. |

FOREIGN PATENT DOCUMENTS

| | | |
|---|---|---|
| KR | 10-2010-0117609 | 11/2010 |
| WO | 99/18157 | 4/1999 |
| WO | 2003/031526 | 4/2003 |
| WO | 2005/054384 | 6/2005 |
| WO | 2011/084162 | 7/2011 |
| WO | 2011/133487 | 10/2011 |
| WO | 2013/090341 | 6/2013 |

OTHER PUBLICATIONS

Innovative Chemical Technologies, Thetawet FS-8250 Technical Data Sheet, (1 page). Material available prior to Dec. 15, 2011.

International Search Report and Written Opinion for International Patent Application No. PCT/US2012/069108, dated Apr. 29, 2013; 13 pages.

International Preliminary Report on Patentability for International Patent Application No. PCT/US2012/069108; dated Jun. 17, 2014; 8 pages.

Chinese Office Action and Search Report for Chinese Patent Application No. 201911328758.7, dated Mar. 5, 2021, 11 pages. Search Report in English is on p. 10 of the document.

\* cited by examiner

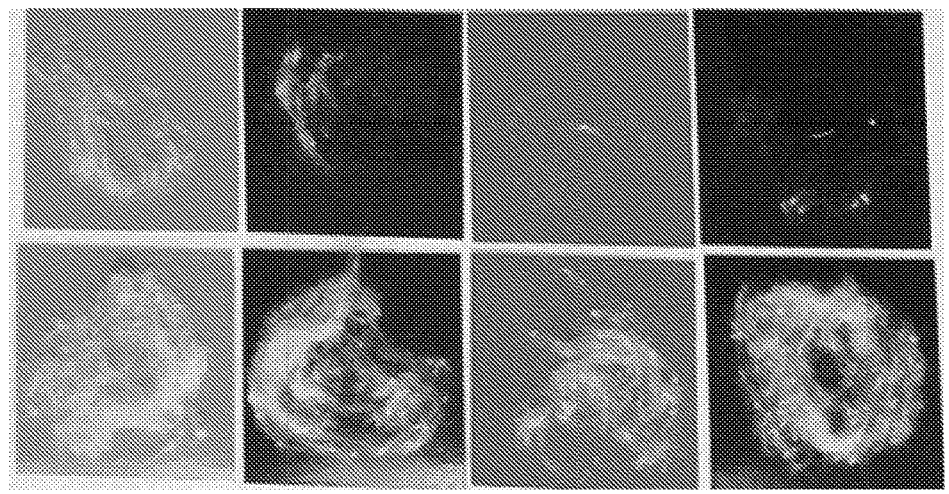

RHEOLOGICAL METHODS FOR HIGH BLOCK, TACK AND SCRUB RESISTANT COATING COMPOSITION

CROSS REFERENCE TO RELATED APPLICATION(S)

This application is a continuation of U.S. application Ser. No. 16/834,416 filed on 30 Mar. 2020, which is a continuation of U.S. application Ser. No. 15/664,676 filed on 31 Jul. 2017, and entitled: "Rheological Methods for High Block, Tack and Scrub Resistant Coating Composition," now U.S. Pat. No. 10,626,284, which is a continuation in part of U.S. application Ser. No. 15/012,240 filed on 1 Feb. 2016 and entitled: "High Block, Tack and Scrub Resistant Coating Composition," now U.S. Pat. No. 10,273,378, which is a continuation in part of U.S. application Ser. No. 14/285,722 filed 23 May 2014, now U.S. Pat. No. 9,611,393, which is a continuation of International Patent Application Serial No. PCT/US2012/069108 filed 12 Dec. 2012, which claims the benefit of U.S. Provisional Application Ser. No. 61/576,021 filed 15 Dec. 2011, the disclosures of which are incorporated by reference herein in their entireties.

BACKGROUND OF THE INVENTION

Conventionally, paint compositions containing latex polymer particles also include a coalescent in addition to pigments and fillers. The coalescent functions as a solvent as well as a plasticizer for the polymer particles to soften the latex polymer particles and assist in the formation of a continuous coating or film after applying to a surface and allowing to dry.

Useful coalescents are generally stable in the presence of water, compatible with other ingredients typically used in paint formulations, particularly the latex polymers, such that the stability of the latex-based composition is not compromised. Typical coalescent agents contain volatile organic compounds (VOC) and are sufficiently volatile to escape when the applied coating composition is allowed to dry, but sufficiently nonvolatile to evaporate more slowly than other ingredients (e.g., drying retarders, antifreezes) that delay film formation.

For environmental and regulatory reasons, it has become imperative to develop latex polymers that can be used in paint and coating compositions without the use of volatile organic compounds (VOCs). Coalescent agents of the type described in U.S. Pat. Nos. 6,762,230 and 7,812,079, for example, are low-VOC compounds that meet stringent environmental requirements, while facilitating film formation.

To make paint formulations of a desired color and finish, base paint compositions are combined at a point-of-sale with low-VOC colorant compositions of the type described in U.S. Pat. No. 7,659,340, for example. However, typical low VOC paints with low VOC colorants tend to form soft, tacky coatings that show poor performance characteristics, such as poor block resistance and poor scrub resistance, for example. This situation is further complicated in deeply colored paint formulations that require high loading of the low VOC or zero-VOC colorants, which generally have residual non-volatile soft components, making hard film formation even more difficult.

Conventionally, the methods used to assess certain performance characteristics paint formulations have relied on visual and observational tests. Such tests are only semi-quantitative and do not provide insight into structure property relationships. Moreover, some of the conventional methods are known to have low repeatability, and ratings taken by different operators and/or at different times may vary considerably. Therefore, it is often difficult to predict performance characteristics of a paint formulation relying on conventional methods of testing.

From the foregoing, it will be appreciated that there is a need for latex compositions for use in paint formulations, including deeply colored formulations that form hard films in the presence of low VOC or zero-VOC components soft components, even in the absence of coalescent agents, and demonstrate excellent performance characteristics, including block, scrub and tack resistance. There is also a need for quantitative methods or tests that can be used to predict paint performance.

SUMMARY OF THE INVENTION

The present invention provides coating compositions that include multistage latex polymers, for use in low VOC, colored paint formulations. These formulations include deeply colored formulations, made by adding colorant compositions to base paint formulations at a point-of-sale. Surprisingly, and in contravention of industry bias, systems that include the latex polymer described herein are preferably capable of film formation, and the paints demonstrate excellent tack resistance, block resistance and scrub resistance. Rheological techniques as described herein may be used to determine tack resistance, print resistance, and other performance characteristics.

Accordingly, in one embodiment, the present invention provides base paints that include a multistage latex polymer having at least a first stage and a second stage. The base paint formulations have scrub resistance of at least 1000, a storage modulus (F) of about $1.0 \times 10^6$ to 1.0 to $10^7$ Pa at 60° C. and 0.1 rad/s and tan ($\delta$) of less than about 0.2 at 60° C. and 0.1 rad/s, representative of and print resistance of the base paints.

In another embodiment, the present invention provides a method of making a paint formulation of a desired color by adding a colorant composition to a base paint formulation at a point-of-sale, wherein the base paint formulation includes a multistage latex polymer having at least a first stage and a second stage. In another embodiment, the present invention provides a method comprising the steps of preparing a first monomer mixture for the first stage, preparing a second monomer mixture for the second stage, and feeding the first and second monomer mixtures in a sequential feed process to form the multistage latex polymer, wherein the latex polymer has low VOC content, and is preferably capable of film formation in the absence of a coalescent.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings provided below.

The term "component" refers to any compound that includes a particular feature or structure. Examples of components include compounds, monomers, oligomers, polymers, and organic groups contained there.

The term "double bond" is non-limiting and refers to any type of double bond between any suitable atoms (e.g., C, O, N, etc.). The term "ethylenically unsaturated" refers to compounds that include a carbon-carbon double bond (i.e. —C=C—).

The term "volatile organic compound" ("VOC"), as defined by the Environmental Protection Agency (EPA) in 40 C.F.R. 51.100(s), refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") is as measured by ASTM method D2369-90, and means the weight of VOC per volume of the coating solids, and is reported, for example, as grams VOC per liter (g/L).

As used herein, the term "glass transition temperature" or "Tg" refers to the temperature at which an amorphous, solid material undergoes a reversible transition to a molten, rubber-like state. Unless otherwise indicated, the Tg values described herein are theoretical values predicted using the Fox equation. Application of the Fox equation to estimate the Tg of polymers is well known in the art.

The term "substantially free of VOC" means that the compositions of the present invention contain less than about 50 g/L VOC. Unless otherwise indicated, the terms "low VOC" and "substantially free of VOC" are used interchangeably herein. The term "essentially free of VOC" means that the compositions of the present invention contain less than 5 g/L of VOCs. The terms, "zero VOC" and "essentially free of VOC" are used interchangeably herein.

The term "substantially free," when applied to components of a composition and not to VOC levels, means that the compositions of the present invention contain no more than about 5 wt % of a particular component, based on total weight of solids in the composition. For example, a composition of the present invention that is substantially free of coalescent contains no more than about 5 wt % coalescent. A composition of the present invention that is essentially free of coalescent contains no more than about 0.5 wt % of coalescent.

The term "water-dispersible" in the context of a water-dispersible polymer means that the polymer can be mixed into water (or an aqueous carrier) to form a stable mixture. For example, a mixture that readily separates into immiscible layers is not a stable mixture. Unless otherwise indicated, the term "water-dispersible" is intended to include the term "water-soluble." In other words, by definition, a water-soluble polymer is also considered to be a water-dispersible polymer.

The term "dispersion," as used herein, in the context of a dispersible polymer refers to the mixture of a dispersible polymer and a carrier. Unless otherwise indicated, the term "dispersion" is intended to include the term "solution."

As used herein, the term "pigment" refers to an organic or inorganic material, and is typically (but not exclusively) in solid form.

As used herein, the term "colorant" refers to a dispersion of pigment in a mobile phase, typically in liquid form, which is added to a coating composition to modify or alter its color or hue, typically at a point-of-sale. As the term is used herein, a colorant may include one or more pigments, dyes and/or inks, along with other additives.

As used herein, the term "base paint" means a composition that includes a vehicle component containing a binder or resin component, and a pigment or filler component dispersed into the vehicle component. As used herein, the base paint formulation includes water as the vehicle, a latex polymer as the binder or resin component, and one or more pigments or fillers used to tone or opacify the base paint as the pigment component.

The base paints described herein are "in-store tintable," meaning that the base paints are present in containers (such as paint cans, for example) and can be tinted or colored by adding a colorant composition in the store, i.e. at a point of sale, to provide a paint formulation of a desired color and finish.

As used herein, the term "container" means any vessel (either with or without a lid or other type of closure) used to store, mix, tint or color a paint formulation, and includes the vessels in which paints are typically marketed and sold. Suitable containers include paint cans, paint bottles, containers made of metal, containers made of plastic and/or other polymeric materials, and the like.

The term "headspace," as used herein, refers to the volume remaining in a container after the container has been filled with a base paint.

The term "scrub resistance," as used herein, refers to the ability of the surface of a coating film or paint film to resist being worn away or to maintain its original appearance when rubbed with or against an abrasive surface, typically during cleaning. To measure scrub resistance, a standard test method, ASTM D2486-96 (Standard Test Method for Scrub Resistance of Wall Paints).

As used herein, the term "block resistance" means the ability of a coating film or paint film, when applied to two surfaces, not to stick to itself on prolonged contact when pressure is applied for a defined period of time. It is a measure of the degree of hardness and/or degree of cure of a film of a coating composition or paint formulation, and is measured by a standard test method, ASTM D4946-89 (Standard Test Method for Blocking Resistance of Architectural Paints).

The term "tack resistance," as used herein, refers to the residual tack of a coating film or paint film after it has been applied to a substrate surface and dried. Tack resistance was measured using standard methods known in the art.

The term "storage modulus," or E', as used herein, refers to the stored energy in a viscoelastic material such as a paint, for example. Storage modulus corresponds approximately to the solid-like character of the paint. The term is used interchangeably with "elastic modulus" herein.

The term "loss modulus" or E" refers to the energy dissipated as heat by a viscoelastic material such as a paint, for example. Loss modulus corresponds approximately to the liquid-like character of the paint.

The ratio of loss modulus to storage modulus (E"/E') is represented by tan (δ) and corresponds to the relative liquid-like/solid-like character of a paint.

As used herein, the storage modulus and/or loss modulus are measured isothermally, i.e. at a single temperature of either 25° C. or 60° C., for example, and at a particular frequency, i.e. 2.1 rad/s or 0.1 rad/s, for example.

Unless otherwise indicated, a reference to a "(meth) acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DESCRIPTION OF THE DRAWINGS

FIG. 1 is a photographic representation of the Cotton Ball Print Test.

DETAILED DESCRIPTION

Embodiments of the invention described herein feature an in-store tintable base paint formulation that includes a multistage latex polymer having at least a first stage and a second stage, wherein the latex is preferably capable of forming a film even in the absence of a coalescent agent. The base paint formulation as described herein is preferably substantially free of volatile organic compounds (VOC), and is used to make coating compositions or paints, including deeply colored paints, by the addition of colorant compositions to the base paint at the point-of-sale. Preferred paints demonstrate excellent performance characteristics, such as optimal block resistance, and superior scrub resistance and tack resistance, for example. Rheological techniques as described herein may be used to determine tack resistance, print resistance, and other performance characteristics.

Rheological techniques as described herein may be used to determine tack resistance, print resistance, and other performance characteristics. By characterizing the viscoelastic and rheological behavior of the paint compositions described herein, it may be possible to predict performance characteristics of other paint compositions.

In an embodiment, the invention described herein includes an in-store tintable base paint that comprises a multistage latex polymer. The term "multistage," as used herein with respect to a latex means the latex polymer was made using discrete, sequential charges of two or more monomers or monomer mixtures, or was made using a continuously-varied charge of two or more monomers.

A multistage latex does not necessarily exhibit a single Tg inflection point as measured by differential scanning calorimetry (DSC). For example, a DSC curve for a multistage latex made using discrete charges of two or more monomers may exhibit two or more Tg inflection points. In cases where a DSC curve shows only a single Tg inflection point, or even no Tg inflection points, it may be difficult to determine whether the latex is single stage or multistage, as the observation of a Tg inflection point depends on various factors, including the relative concentration of monomers in a particular stage. The presence or absence of Tg inflection points on a DSC curve is not dispositive, but a multistage latex may be described in terms of the theoretical Tg values for each monomer stage, as determined by the Fox equation.

In an embodiment, a method of making a multistage latex having at least a first stage and a second stage is described herein. The method includes steps of providing a first monomer or mixture for the first stage, providing a second monomer or mixture for the second stage; and feeding the first and second monomers or mixtures into a reaction vessel to form a multistage latex that is capable of film formation in the absence of a coalescent agent.

Various methods can be used to prepare the multistage latex described herein, including for example, sequential monomer feed and continuously varying monomer feed techniques. In a sequential monomer feed process, a first monomer or monomer mixture is fed during the early stages of polymerization, and a second monomer (i.e. a different monomer, or a mixture of monomers present in different ratios than in the first monomer mixture) is fed during later stages of polymerization. In a varying monomer feed process, a first monomer composition is fed, followed by the addition of a second monomer at certain points in the polymerization process, and at different speeds. By controlling the type of monomers selected for the feed process, a multistage latex suitable for low VOC, coating compositions or paints may be formed, and the latex preferably provides excellent performance characteristics, such as, for example, block resistance, scrub resistance, tack resistance, and the like, for such coating or paint formulations.

In an embodiment, the multistage latex composition described herein is made by a sequential monomer feed process. In an aspect, polymerization begins with a high Tg monomer feed followed by a low Tg monomer feed, and vice-versa. In a preferred aspect, polymerization begins with a high Tg monomer feed, followed by a low Tg monomer feed.

In an embodiment, the multistage latex composition described herein is made using varying monomer feeds. The resulting polymer will typically have a DSC curve that exhibits no Tg inflection points, and could be said to have an essentially infinite number of Tg stages. The resultant multistage latex will have a gradient Tg from high to low, or vice-versa, depending on the order that monomers of high Tg are fed into the reaction.

In a preferred aspect, the multistage latex described herein is made by a sequential monomer feed process using at least two distinct feeds of monomers. In an aspect, a high Tg stage (i.e. a hard stage) is fed first into a reactor vessel, and a low Tg stage (i.e. a soft stage) is added at a later stage in the process. A multistage latex may be formed, and after coalescence, the composition will typically display two distinct Tg values, or at least one Tg corresponding to the monomer stage present at higher concentration. Without being bound to theory, it is expected that no distinct Tg will be observed or detected by DSC for a monomer or monomer mixture in a particular stage that is present in very small quantities relative to the other monomer or monomer mixture.

In an aspect, the multistage latex optionally includes a seed phase, i.e. a relatively small monomer or polymer particle, but the seed is not required, nor essential for preparation or optimal performance of the multistage latex when used in a coating composition or paint formulation.

In an aspect, the relative positions of the first and second phases may be internal and external respectively, or vice-versa. In another aspect, the first and second phases may be neighboring or adjacent. Without being bound by theory, it is believed that the relative position of the stages of the multistage latex is influenced by the method used to make the latex. By controlling the monomers used in each stage of the sequential monomer feed process, the multistage latex described herein will contain about 10 wt % to 50 wt %, preferably about 20 to 40 wt %, more preferably about 25 to 35 wt % of monomers of the first stage, i.e. high Tg or hard stage monomers, and about 50 wt % to 90 wt %, preferably about 60 to 80 wt %, more preferably about 65 to 75 wt % of monomers of the second stage, i.e. low Tg or soft stage monomers, based on the total weight of the composition.

In an embodiment, by controlling the monomers used for each stage of the sequential monomer feed process, a multistage latex composition with optimal minimum film forming temperature (MFFT) is obtained. The MFFT is the minimum temperature at which the multistage latex composition will form a continuous film, i.e. the temperature below which coalescence does not occur. The MFFT of the multistage latex composition as described herein is preferably less than about 20° C., more preferably less than about 10° C. A base paint or other paint that includes the multistage latex described herein has MFFT of less than about 20° C., preferably less than about 10° C.

In an embodiment, the multistage latex described herein preferably includes at least two polymer portions. In a preferred embodiment, the multistage latex includes at least a first stage and a second stage. In an aspect, the multistage latex includes up to about 50%, preferably about 10% to 40%, more preferably 15% to 35% of one or more monomers or a mixture of monomers comprising the first stage. In an aspect, the multistage latex includes about 50%, preferably 60% to 90%, more preferably 75% to 85% of one or more monomers or a mixture of monomers comprising the second stage.

In an embodiment, the multistage latex described herein preferably includes at least two polymer portions with different Tg values. In a preferred embodiment, the multistage latex includes at least a first stage and a second stage. The first stage preferably has a Tg of about 0° C. to 120° C., more preferably about 50° C. to about 80° C. The second stage preferably has a Tg of greater than about −35° C. to 10° C. In an embodiment, where the multistage latex is intended for use in a pigmented high gloss or semi-gloss paint, the first stage preferably has Tg of about 0° to 120° C., more preferably 25° to 75° C., most preferably 45° to 55° C.

In an embodiment, the multistage latex described herein preferably includes at least two polymer portions, i.e. a first stage and a second stage, with different Tg values, where the difference in Tg (ΔTg) is about 35° C., preferably about 65° C. In an embodiment, where the multistage latex is intended for use in a pigmented high gloss or semi-gloss paint, the difference in Tg (ΔTg) is preferably about 35° C., more preferably about 65° C.

In an embodiment, the invention described herein includes a multistage latex polymer having at least a first stage and a second stage. In an aspect, the first stage and second stage of the multistage latex separately and preferably include one or more ethylenically unsaturated monomers. In another aspect, the first and second stage of the multistage latex separately and preferably includes the one or more polymerization product(s) of (i) ethylenically unsaturated monomers, such as, for example, alkyl and alkoxy (meth)acrylates, vinyl esters of saturated carboxylic acids, monoolefins, conjugated dienes, optionally with (ii) one or more monomers, such as, for example, styrene, methyl methacrylate, butyl acrylate, 2-ethylhexyl acrylate, vinyl acetate, acrylonitrile, vinyl chloride, and the like. In an embodiment, the first stage or second stage of the multistage latex optionally includes one or more polyfunctional (meth)acrylate monomers. In an embodiment, the first stage and second stage separately and preferably also include one or more ethylenically unsaturated carboxy-functional amide monomers, e.g., ureido-functional monomers, such as monomers formed as the product of the reaction between aminoalkyl alkylene urea (e.g., amino ethylene urea, for example) with an ethylenically unsaturated carboxylic acid or anhydride (e.g., maleic anhydride, for example).

Suitable ethylenically unsaturated monomers of the first and second stage include, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth)acrylamide, styrene, α-methyl styrene, vinyl toluene, vinyl acetate, vinyl propionate, allyl methacrylate, and mixtures thereof. Preferred monomers include styrene, methyl methacrylate, methacrylic acid, acetoacetoxy ethyl methacrylate, butyl acrylate, and the like.

Suitable polyfunctional acrylates include, for example, di-, tri- and tetra-functional acrylates such as dipropylene glycol diacrylate (DPGDA), propoxylated glyceryl triacrylate (GPTA), pentaerythritol tetraacrylate, dipentaerythritol tetraacrylate, mixtures thereof, and the like. Preferred polyfunctional acrylate monomers include pentaerythritol tetraacrylate, dipentaerythritol tetraacrylate, and the like.

Suitable ureido-functional monomers include, for example, monomers with the —NR—(C═O)—NH— functionality, where R may be H, substituted or unsubstituted $C_1$-$C_{10}$ alkyl, substituted or unsubstituted $C_3$-$C_6$ cycloalkyl or heteroalkyl, and the like. Without being bound by theory, ureido-functional monomers are believed to promote the wet adhesion of a paint formulation to a substrate, where the formulation includes the multistage latex described herein.

In an embodiment, the first or second stage of the multistage latex each separately and preferably include about 90 to 99 wt %, more preferably about 94 to 96 wt %, and most preferably about 97 to 98 wt % of one or more ethylenically unsaturated monomers, and preferably up to about 5 wt %, more preferably about 1 to 4 wt %, and most preferably about 2 to 3 wt % of one or more ureido-functional monomers, based on the total weight of the monomers in the first or second stage respectively. For example, in a preferred embodiment, the first stage includes about 70 wt % methyl methacrylate, 23% butyl acrylate, 2 wt % methacrylic acid, 2-4 wt % DAAM, and about 1 wt % ureido-functional monomer. In a preferred embodiment, the second stage includes about 30 wt % methyl methacrylate, 60 wt % butyl acrylate, about 2-4 wt % DAAM, about 2 wt % methacrylic acid, and about 1 wt % ureido-functional monomer.

In an embodiment, the multistage latex described herein includes, optionally and preferably, a fluorosurfactant. As used herein, the term "fluorosurfactant" refers to synthetic organofluorine compounds with multiple fluorine atoms. Such compounds can be polyfluorinated, perfluorinated (i.e. fluorocarbons), or partially fluorinated, and typically include a hydrophilic head and a fluorinated/hydrophobic tail. Suitable fluorosurfactants may be anionic or nonionic. Commonly used fluorosurfactants include, for example, fluoroalkanes, perfluoroalkanes, their derivatives, and the like. In an aspect, short chain fluorinated compounds are preferred, such as, for example, C1-C10 fluorinated compounds. In a preferred aspect, the fluorosurfactant is an anionic C6-fluorocarbon compound, and is preferably substantially free of PFOS and PFOA, and more preferably, essentially free of PFOS and PFOA. In a preferred aspect, the multistage latex preferably includes up to about 0.5 wt %, more preferably about 0.1 to 0.3 wt %, based on the total weight of the multistage latex composition.

The composition described herein may include other components or additives, added to either the reaction mixture of monomers used to make the multistage latex, to the latex, or to a coating composition or base paint that includes the latex. Suitable additives are known to those of skill in the art and include, for example, surfactants, open time agents, pH adjustors, initiator and chaser solutions, cross-linking agents, preservatives, defoaming agents, anticorrosive agents, and combinations thereof.

In an aspect, the multistage latex composition described herein may include a coalescing agent that aids in film formation. Suitable coalescing agents or coalescent compounds are dispersible in a coating composition or paint that includes the latex described herein, and facilitate film formation at temperatures of less than about 25° C., and even at temperatures of 5 to 10° C. Preferred coalescing agents have VOC content of less than about 50%, preferably less than about 30%, more preferably, less than about 20%, and most preferably, less than about 15%. Exemplary suitable coalescing agents include low VOC compounds of the type described in detail at least in U.S. Pat. Nos. 6,762,230 and 7,812,079. Other suitable low VOC coalescents include Optifilm (Eastman Chemical, Kingsport Tenn.), Loxanol (Cognis, Kankakee Ill., now BASF), Archer RC (ADM, Decator Ill.), and the like. Conventional coalescing agents such as, Texanol (Eastman Chemical) and the like can also be used, either alone or in combination with other solvents such as, for example, 2-butoxyethanol (butyl cellosolve), diethylene glycol monobutyl ether (butyl carbitol), and the like, provided low VOC levels are maintained in the coating composition or paint.

Although coalescing agents are typically used in paint to aid in film formation, the paint made with the multistage latex described herein is oftentimes capable of film formation at low levels of coalescent, or even in the absence of coalescing agents, at film-forming temperatures of 20° C. or less, more preferably at temperatures of 10° C. or less. Accordingly, in an aspect, the coalescing agent is an optional ingredient in coating compositions or paints that include the latex described herein, and in a preferred aspect, the coating composition or paint is substantially free, and more preferably, essentially free of coalescing agents. In a preferred aspect, the composition described herein includes no more than about 10 wt %, preferably less than 10 wt % coalescing agent.

In an embodiment, the multistage latex composition described herein is suitable for use in a low-VOC or zero-VOC coating composition or a paint to be colored or tinted to a desired color and finish, such as an in-store tintable base paint, for example. In an aspect, the coating composition or paint may include one or more pigments, including pigments or fillers used to tone or opacify the in-store tintable base paint. Suitable examples of pigments include, without limitation, titanium dioxide white, carbon black, lamp black, black iron oxide, red iron oxide, yellow iron oxide, brown iron oxide (a blend of yellow and red oxide with black oxide), phthalocyanine green, phthalocyanine blue, organic reds (such as naphthol red, quinacridone red and toluidine red), quinacridone magenta, quinacridone violent, DNA orange, and/or organic yellows (such as Hansa yellow), for example.

In an embodiment, the multistage latex composition can be used in a coating composition, such as a paint, especially a base paint to be colored or tinted at the point-of-sale of a paint of desired color and finish. In an aspect, the base paint may be clear (unpigmented) or pigmented prior to being colored or tinted. In an aspect, the base paint is tinted or colored in-store using one or more commercially available colorants. Suitable colorants which can be used in a coating composition or paint formulation include, for example, NovoColor (Color Corp. of America, Louisville Ky.) colorants, i.e. zero-VOC colorants compatible with water-based coating compositions as described herein. Preferred colorant compositions include a colorant component, i.e. a pigment dispersed in a liquid phase, a surfactant package that includes a latex-compatible surfactant, a carrier, and other optional additives. Exemplary colorant compositions include single colorant formulations compatible with latex paints, of the kind described in U.S. Pat. Nos. 6,488,760 and 7,659,340. These colorant compositions are uniform and do not require mixing before addition to a base paint formulation, have extended shelf-life, and show viscosity increase of less than about 15 KU, more preferably less than about 10 KU, when stored over an extended period of time at temperatures of about 40° to 50°.

In an aspect, the multistage latex composition can be used in a base paint formulation to be tinted to produce a dark or deeply colored paint. To produce such dark or deeply colored paint requires a high colorant load. In an aspect, the amount of colorant to be added to the base paint is determined by the desired color and finish (i.e. glossy, semi-gloss, satin, etc.) of the colored paint. Preferably, the paint includes up to about 20 wt % colorant, more preferably about 5 to 15 wt % colorant, and most preferably about 8 to 12 wt % colorant.

Typically, the viscosity of the base paint decreases when the colorant composition is added. A deeply colored paint requires a high colorant load, and therefore, the colored paint will have a lower viscosity and may have poor properties on application to a substrate. Moreover, as base paints are made to have low or no VOC by using softer polymers, and low or no VOC-containing colorants added to the base paint have a high percentage of non-volatile soft components, it is difficult to form a hard acrylic film or coating, with good mechanical properties, i.e. block resistance, and scrub resistance, for example. Surprisingly, the multistage latex described herein, when used in a base paint to be tinted to a colored paint, and especially a deeply colored paint, resists softening even at the high colorant load, with a correspondingly high percentage of non-volatile soft components, needed to make a deeply colored paint. Contrary to expectation, paints made using the multistage latex described herein provide excellent block resistance while maintaining superior scrub resistance when compared to commercially available latex polymers.

In contravention of industry bias, when used in paint applied at high temperatures and/or in very humid environments, the paint including multistage latex described herein displays excellent performance characteristics, with optimal scrub resistance and tack resistance, along with superior block resistance relative to formulations made using commercially available latex polymers.

In an embodiment, paints made with the multistage latex described herein demonstrate excellent block resistance. Block resistance is measured by a standard test as described below, and block ratings are assigned on a scale from 0 to 10, where a rating of 0 corresponds to very poor block resistance, and a rating of 10 corresponds to excellent block resistance. In an aspect, the paints described herein show 1-day and 7-day block ratings of preferably at least 6, more preferably at least 7, and most preferably at least 8.

In an embodiment, paints made with the multistage latex described herein demonstrate superior scrub resistance, when compared to commercially available formulations. Scrub resistance is measured by a standard test as described below. The film is cured for seven (7) days, and scrub resistance is reported as a number of scrubs applied before the film failed, i.e. scrubbed off the substrate surface. In an aspect, the paints described herein display scrub resistance of at least about 600 scrubs, more preferably at least about 800, even more preferably at least about 1000, and most preferably at least 1100.

In an embodiment, paints made with the multistage latex described herein demonstrate excellent tack resistance. Tack resistance is measured by a standard test as described below, and reported as the time following initial cure that the surface of the film is no longer sticky to the touch. In an aspect, the paints described herein preferably display a tack force of less than 1.1 lbF, and more preferably less than 0.7 lbF.

In an embodiment, paints with the multistage latex described herein demonstrate superior print resistance relative to commercially available formulations. Print resistance is measured by a standard test as described below. A paint sample is applied and dried for a specified time and at a specified temperature and humidity. Samples are rated on a scale of 0 to 10, with 10 representing the highest print resistance. In an aspect, the paints described herein preferably demonstrate print resistance of at least 8, preferably 9, and more preferably 10.

Conventional methods for measuring the tack and print resistance of a paint composition are problematic, however, because these test methods are only semi-quantitative and do not provide insight into the structure-function relationship of the paint composition. For example, ASTM D2064-91 (Standard Test Method for Print Resistance of Architectural Paints) estimates that repeatability of this method for an experienced operator is only plus or minus one unit on a 0-10 scale and that numerical ratings for different operators or taken at different times may differ. As a result, the conventional tests do not have as much use as predictive tools for the performance of a paint or as objective, quantitative tools to characterize the performance of a paint.

In certain embodiments, rheological methods are used to test the coating compositions described herein. Specifically, the viscoelastic properties of the compositions are assessed by measuring storage modulus (E') and loss modulus (E"). These methods provide better understanding of the structure-function relationship of the compositions and allow the quantification of physical properties corresponding to the tack resistance and print resistance of the paint formulations described herein.

Without limiting to theory, it is believed that high E' values correlate well with superior tack resistance, i.e. coating with higher E' values will have lower probe tack and perceived tack. Similarly, E' is believed to correlate well with print resistance such that paint compositions with high E' values will have superior print resistance. This relationship between storage modulus and print resistance may also be expressed in terms of tan ($\delta$) values, where lower tan ($\delta$) values correlate with superior print resistance.

Accordingly, in an embodiment, the paint compositions described herein may be characterized by the rheological behavior of these compositions. Specifically, the compositions described herein have E' values of $1.0 \times 10^6$ to 1.0 to $10^7$ Pa at 60° C. and 0.1 rad/s, preferably $1.0 \times 10^6$ to $7.0 \times 10^6$ Pa, more preferably $2.0 \times 10^6$ to $3.0 \times 10^6$ Pa. These values correlate with a perceived tack rating of 1 (least tacky) when assessed in a perceived tack survey.

In an embodiment, the compositions described herein have tan ($\delta$) values of preferably less than 0.2 at 60° C. and 0.1 rad/s, preferably less than 0.15, and more preferably about 0.05 to 0.15. These values correlate to a cheesecloth print resistance of at least 8, preferably 9 when assessed by ASTM D2046-91.

In an aspect, the multistage latex composition described herein can be used in a coating composition or paint that further includes one or more additives. Suitable additives include, without limitation, fillers, thixotropes, rheological modifiers, matting agents, and the like. The additives may include one or more ingredients added to a paint to modify the properties or enhance paint performance during storage, handling, application and other or subsequent stages. Desirable performance characteristics of a paint formulation include, for example, chemical resistance, abrasion resistance (i.e. scrub resistance), tack resistance, hardness, gloss, reflectivity, appearance and/or a combination of such properties and similar other properties. Preferred performance enhancing additives include lacquers, waxes, flatting agents, additives to prevent mar, abrasion, and the like.

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

EXAMPLES

Unless indicated otherwise, the following test methods were utilized in the Examples that follow.

Scrub Resistance

The scrub resistance of the paint formulations is tested using ASTM D2486-96 (Standard Test Method for Scrub Resistance of Wall Paints).

Cotton Ball Print Resistance

The cotton ball print resistance of the paint versions is tested using a modified version of ASTM D2064 (Standard Test Method for Print Resistance of Architectural Paints), modified using a cotton ball instead of cheesecloth. Briefly, the test uses 3-mil wet drawdowns on Leneta charts. Two inch square test samples are cut from the chart at various cure times. Half a cotton ball is placed between the paint sample and the bottom of the rubber stopper. The test is run with a 500 g weight on top of the stopper at 60° C. for one hour. The sample is then kept at room temperature for 30 minutes. The cheesecloth is pulled off in one smooth motion. Samples are rated on a scale 0 to 10 based on a visual assessment of the amount of cotton that remains stuck to the sample, where 0 represents 100% cotton stuck and 10 represents 0% cotton stuck.

Tack Test

The tack test used herein is modified from the test described in Cakmak et al., eXPRESS Polymer Letters (2011), 5, 1009-1016. In this test method, an electromechanical tensile tester is used to quantify surface tack, and method is optimized for use with paint formulations. Aluminum Q-panel sheets were painted and after 24 hours, cut into test samples. Each measurement was made on a separate panel and an average value of 3-6 panels was recorded. The run parameters on the tensile tester were: 5 lbF pressed into sample, 3 second hold-time, and 0.2 in/min velocity of the head fixture removing from the sample.

Block Resistance

The block resistance of the paint formulations is tested using ASTM D4946-89 (Standard Test Method for Blocking Resistance of Architectural Paints).

Cheesecloth Print Resistance

The print resistance of the paint formulations is tested using ASTM D 2064-91 (Standard Test Method for Print Resistance of Architectural Paints). Briefly, the test is performed as follows. A cheesecloth and No. 8 stopper are placed onto a paint film and a 500 g weight is placed on top of the configuration. The assembly is then placed in an oven for a specified time and a specified temperature, i.e. 60° C. for one hour. The assembly is then removed from the oven and the weight and stopper are removed. After a specified time period, the cheesecloth is removed and the film is examined to determine the depth and amount of cheesecloth pattern in the paint film. Samples are rated on a scale 0 to 10 based on the amount of material that remains stuck to the sample, where 0 represents a significant amount of cheesecloth pattern left on the paint film and 10 represents no cheesecloth pattern left on the paint film.

Rheological Testing at 0.1 Rad/s and 60 C

The viscoelastic properties of paint films were evaluated using a RSA-G2 Solids Analyzer rheometer outfitted with tension clamp accessory. These properties include the dynamic storage modulus (E') and the dynamic loss modulus (E") which are indicative of the solid-like and liquid-like character of the paints, respectively. In addition, tan($\delta$) was calculated as tan($\delta$)=E"/E' provides information on the samples ability to viscously dissipate energy. Paint samples were drawn down onto release paper using a 6 mil Bird type film applicator bar. Samples were prepared and dried and conditioned 24+/−1 hour prior to testing in a controlled temperature and humidity room (73.5±3.5° F. and 50±5% relative humidity). Samples were cut using a dual blade cutter to create a film with a width of 5.3 mm and a length of at least 45 mm. The thickness of the sample was measured using a micrometer. The thickness value that was used represents the average of three readings using the microm-eter. The tension clamps were zeroed at 25° C. and the sample gap (grip-to-grip distance) was set to 40 mm. All samples were loaded so that they had great than 0.01 N but less than 1 N of tension force applied. The samples were loaded into the tension clamp. Slippage of the samples was prevented by utilizing wrapping sandpaper around the part of the sample that was placed in the grips. The sample oven was subsequently closed and the sample was equilibrated to 60° C. for 3 minutes prior to data acquisition. Data was acquired at a frequency of 0.1 rad/s (0.0159 Hertz) and a 0.2% strain. The data reported represents the average of two measurements. After each experiment, a strain sweep was performed to ensure that the measurements were within linear viscoelastic window by looking to see if the storage modulus, E', deviated by more than 10% at 0.2% strain.

Perceived Tack Survey and Rheological Testing at 2.5 Rad/s 25° C.

A survey was conducted to correlate viscoelastic measurements to perceived tack. Five paint samples with varying tack were drawn down onto LENETA cards using a 6 mil Bird type applicator bar. The paint films were dried for 24+/−1 hours before cutting the samples into squares of approximately 1 by 1 inch dimensions. The study was conducted blindly by renaming the samples A-E. 25 participants were asked to evaluate the tack of the samples by using their thumbs and contacting the paint films for 3 seconds. The participants were asked to rank the samples on a scale of 1 to 5 with 1 representing the sample perceived to be least tacky, and 5 representing the sample perceived to be most tacky. The perceived tack ratings were averaged among the participants to determine the average perceived tack rating of the paints. The paint films were prepared and the viscoelastic properties of the paint films were measured in a manner similar as described previously. However, for this test, the samples were tested at 25° C. and 2.5 rad/s (0.398 Hertz) with a strain of 0.05%. The angular frequency ($\omega$) was chosen since this roughly corresponds to 3 seconds (t=2$\pi$/$\omega$) which was the approximate contact time used for the perceived tack survey.

Example 1: Preparation of White High Gloss Formulation (Comparative)

A 100-gallon formulation of a white high-gloss paint was prepared using the ingredients listed in Table 1. The polymer in Table 1 is a commercially available latex polymer system known to provide optimal block resistance (Rhoplex™ HG706, available from Dow).

TABLE 1

| White High-gloss Formulation #1 | |
|---|---|
| Raw Material | Amount (lbs) |
| Water | 159 |
| Dispersant | 7.0 |
| Surfactant | 3.5 |
| Defoamer | 1.0 |

TABLE 1-continued

White High-gloss Formulation #1

| Raw Material | Amount (lbs) |
| --- | --- |
| Pigment | 225.0 |
| Polymer | 620.0 |
| Coalescent | 8.3 |
| Defoamer | 5.2 |
| Neutralizing Agent | 1.0 |
| High-shear Thickener | 6.8 |
| Low-shear Thickener | 4 |
| Total | 1040.8 |

Example 2: Preparation of White High-Gloss Formulation (Inventive)

A 100-gallon formulation of a white high-gloss paint was prepared using the ingredients listed in Table 2. The polymer in Table 2 is a multistage latex composition prepared by a sequential monomer feed process as described above, and including at least a first stage and a second stage.

TABLE 2

White High-Gloss Formulation #2

| Raw Material | Amount (lbs) |
| --- | --- |
| Water | 187.1 |
| Dispersant | 7.0 |
| Surfactant | 3.5 |
| Defoamer | 1.0 |
| Pigment | 225.0 |
| Polymer | 582.0 |
| Coalescent | 12.5 |
| Defoamer | 5.2 |
| Neutralizing Agent | 1.0 |
| High-shear Thickener | 6.8 |
| Low-shear Thickener | 4 |
| Total | 1035.0 |

Example 3: Clear High-Gloss Formulation (Comparative)

A 100-gallon formulation of a clear high-gloss base paint was prepared using the ingredients listed in Table 3. The polymer in Table 3 is a commercially available latex polymer system known to provide optimal block resistance. (Rhoplex™ HG706, available from Dow).

TABLE 3

Clear High-Gloss Formulation #3

| Raw Material | Amount (lbs) |
| --- | --- |
| Water | 124.1 |
| Polymer | 696 |
| Defoamer | 1.0 |
| Surfactant | 5.0 |
| Neutralizing Agent | 5.5 |
| Coalescent | 9.2 |
| High-Shear Thickener | 18 |
| Low-Shear Thickener | 14.5 |
| Total | 873.3 |

Example 4: Clear High-Gloss Formulation (Inventive)

A 100-gallon formulation of a clear high-gloss base paint was prepared using the ingredients shown in Table 4. The polymer in Table 4 is a multistage latex composition prepared by a sequential monomer feed process as described above, and including at least a first stage and a second stage.

TABLE 4

Clear High-Gloss Formulation #4

| Raw Material | Amount (lbs) |
| --- | --- |
| Water | 175.4 |
| Polymer | 639 |
| Defoamer | 1 |
| Surfactant | 5 |
| Neutralizing Agent | 5.5 |
| Coalescent | 9.2 |
| High-Shear Thickener | 18 |
| Low-Shear Thickener | 14.5 |
| Total | 867.6 |

Example 5. Comparative Testing of Paint Formulations

The formulations from Examples 1 to 4 were used as paint formulations to coat test panels that were assessed for hardness, tack resistance, block resistance, scrub resistance, and gloss. For the clear formulations in Examples 3 and 4, the base paint formulation in each case was tinted using colorant at a concentration of about 12 ounces of colorant per gallon of the base paint (i.e. 7.5 g/L of colorant) and then coated onto test panels. The white formulations in Examples 1 and 2 were not colored. Testing results are shown in Table 5 and FIG. 1.

TABLE 5

Paint performance

| Polymer | Formulation | Scrubs | Konig Hardness 24 h | HT Block 24 h | 20 degree gloss 24 h | 60 degree gloss 24 h | HT Cotton Ball Print Test 24 h | Tack Force 24 h (lbF) |
| --- | --- | --- | --- | --- | --- | --- | --- | --- |
| Comparative | #1 | 650 | 12 | 8 | 47 | 79 | — | — |
| Inventive | #2 | 1200+ | 17 | 7 | 40 | 76 | — | — |
| Comparative | #3 | NR | 9 | 5 | 47 | 75 | 5 | 2.71 |
| Inventive | #4 | NR | 14 | 7 | 47 | 76 | 9 | 1.05 |

Example 6. Rheological Testing of Paint Formulations

A base paint formulation using a two-stage polymer using DAAM as the crosslinker was made as described in Examples 1 to 4. The base paint formulation was tinted using 12 ounces of colorant per gallon of the base paint (i.e. 7.5 g/L). Paint films were prepared as described above, and their viscoelastic properties (E' and E") were measured. For each paint formulation, perceived tack, dirt pickup resistance, block, cotton ball print resistance, cheesecloth print resistance, scrub resistance, and gloss) (60°) were also measured. For comparison, a base paint formulation using a single stage polymer with DAAM as the crosslinker, two-stage and single stage formulations using AAEM as the crosslinker, base paint formulations without crosslinkers, and several commercially available paint formulations were also tested. Results are as shown in Table 6 and FIG. 1.

TABLE 6

Rheological Testing of Paint Formulations

| Paint Formulation | Average E' (60° C.; 0.1 rad/s) × $10^6$ | Average tan (δ) (60° C.; 0.1 rad/s) | 1 day cotton ball print resistance | 1 day cheesecloth print resistance | Scrubs | 60° gloss |
|---|---|---|---|---|---|---|
| Inventive (two-stage; DAAM) | 2.49 | 0.14 | 9 | 9 | 1200 | 83 |
| Inventive (single stage; DAAM) | 2.00 | 0.13 | 4 | 8 | >1600 | 84 |
| Inventive (two-stage no crosslinker) | 0.99 | 0.31 | 2 | 0 | | |
| Inventive (single stage, no crosslinker) | 0.20 | 0.29 | 2 | 0 | | |
| Inventive (two-stage; AAEM) | 1.26 | 0.31 | 4 | 0 | | |
| Inventive (single stage; AAEM) | 0.28 | 0.25 | 2 | 2 | | |
| Commercial | 7.61 | 0.20 | 10 | 9 | 725 | 79 |
| Commercial | 0.92 | 0.21 | 5 | 7 | | |
| Commercial | 0.93 | 0.22 | 8 | 6 | | |
| Commercial | 2.47 | 0.47 | 8 | 5 | | |
| Commercial | 1.78 | 0.35 | 2 | 5 | | |
| Commercial | 0.62 | 0.24 | 8 | 4 | | |
| Commercial | 0.57 | 0.31 | 5 | 4 | | |
| Commercial | 0.60 | 0.33 | 2 | 4 | | |
| Commercial | 0.56 | 0.33 | 2 | 4 | | |
| Commercial | 0.49 | 0.27 | 0 | 4 | | |
| Commercial | 0.41 | 0.39 | 0 | 4 | | |
| Commercial | 0.56 | 0.41 | 2 | 3 | | |
| Commercial | 0.42 | 0.42 | 0 | 2 | | |
| Commercial | 0.35 | 0.35 | 0 | 2 | | |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A paint container containing a coating composition comprising:
   an in-store tintable base paint formulation comprising:
      a multistage latex polymer derived from monomers comprising a crosslinking component comprising diacetone acrylamide (DAAM);
      wherein the multistage latex polymer comprises at least two stages with different Tg values, where the difference in Tg values is about 35° C. to 65° C.; and
   wherein the base paint formulation contains less than 50 g/L VOC.

2. The paint container of claim 1, wherein the paint container comprises a paint can.

3. The paint container of claim 1, wherein the coating composition is not made using fluorosurfactant.

4. The paint container of claim 1, wherein the coating composition has scrub resistance of at least 1000, storage modulus (E') of about $1.0 \times 10^6$ to 1.0 to $10^7$ Pa at 60° C. and 0.1 rad/s and tan (δ) of less than about 0.2 at 60° C. and 0.1 rad/s.

5. The paint container of claim 1, wherein the multistage latex polymer comprises:
   at least a first stage with Tg of about 0 to 120° C.; and
   at least a second stage with Tg of about −35 to 10° C.

6. The paint container of claim 1, wherein the multistage latex polymer comprises:
   at least a first stage with Tg of about −35 to 10° C.; and
   at least a second stage with Tg of about 0 to 120° C.

7. The paint container of claim 1, wherein the multistage latex polymer is derived from a multistage composition comprising:
   at least a first stage derived from a first mixture of monomers including about 70 to 80 wt % methyl methacrylate, 20 to 30 wt % butyl acrylate, 1 to 2 wt % methacrylic acid, and optionally, about 2 to 4 wt % diacetone acrylamide, based on the total weight of the monomers in the first mixture; and
   at least a second stage derived from a second mixture of monomers including about 30 to 40 wt % methyl methacrylate, about 50 to 70 wt % butyl acrylate, about 1 to 2 wt % methacrylic acid, and optionally, about 2 to 4 wt % diacetone acrylamide, based on the total weight of the monomers in the second mixture;
   wherein the first mixture of monomers and/or the second mixture of monomers comprises the diacetone acrylamide.

8. The paint container of claim 1, wherein the composition has E' corresponding to a cheesecloth print resistance rating of at least 8 according to ASTM D2064-91.

9. The paint container of claim 1, wherein the composition has E' of about $1.0 \times 10^6$ to $1.0 \times 10^8$ Pa at 25° C. and 2.1 rad/s.

10. The paint container of claim 1, wherein the composition has E' corresponding to a perceived tack rating of about 1 to 2.

11. The paint container of claim 1, wherein the difference in Tg values is at least about 50° C.

12. The paint container of claim 1, wherein the multistage latex is capable of forming a film at a temperature of 4° C. or less.

13. The paint container of claim 1, wherein the multistage latex is capable of forming a film at a temperature of 10° C. or less, in the absence of a separate coalescing agent.

14. The paint container of claim 1, wherein the composition further includes no more than about 10% by weight coalescing agent, and is capable of forming a film at a temperature of 20° C. or less.

15. The paint container of claim 1, wherein the composition exhibits a scrub resistance of at least 800.

16. The paint container of claim 15, wherein the composition includes about 5 to 15 wt % of colorant.

17. The paint container of claim 1, wherein the composition exhibits a scrub resistance of at least 1,100.

18. The paint container of claim 17, wherein the composition is a deeply colored paint formulation.

19. The paint container of claim 17, wherein the composition is a pigmented high gloss or semi-gloss paint.

20. The paint container of claim 1, wherein the composition exhibits a 60° gloss rating of at least 80.

21. The paint container of claim 1, wherein the composition includes about 8 to 12 wt % of colorant.

22. The paint container of claim 1, wherein the composition is a pigmented high gloss or semi-gloss paint.

23. The paint container of claim 1, wherein the multistage latex polymer is derived from a multistage composition comprising a ureido-functional monomer.

\* \* \* \* \*